United States Patent [19]
Livesay

[11] Patent Number: 5,732,743
[45] Date of Patent: Mar. 31, 1998

[54] METHOD OF SEALING PIPES

[75] Inventor: Mark Livesay, El Cajon, Calif.

[73] Assignee: LS Technology Inc., Philadelphia, Pa.

[21] Appl. No.: 663,799

[22] Filed: Jun. 14, 1996

[51] Int. Cl.$^6$ ..................................................... F16L 55/16
[52] U.S. Cl. ........................... 138/99; 285/293; 156/158
[58] Field of Search ............................ 138/99, 97, 109, 138/155; 285/293, 292, 915, 399; 156/158

[56] References Cited

U.S. PATENT DOCUMENTS

| 2,050,023 | 8/1936 | Slayter | 285/293 |
|---|---|---|---|
| 2,924,546 | 2/1960 | Shaw | 285/293 X |
| 3,100,658 | 8/1963 | Miller et al. | 285/293 X |
| 3,379,218 | 4/1968 | Conde | 138/99 |
| 3,770,556 | 11/1973 | Evans et al. | 138/99 X |
| 4,032,176 | 6/1977 | Tabary | 285/293 X |
| 4,366,972 | 1/1983 | Franklin | 285/293 X |
| 4,756,337 | 7/1988 | Settineri | 138/99 |
| 5,166,007 | 11/1992 | Smith et al. | 428/63 |
| 5,387,493 | 2/1995 | Imabayashi et al. | 430/280 |
| 5,461,086 | 10/1995 | Kato et al. | 522/37 |

OTHER PUBLICATIONS

International Application #WO 91/18239 Berglund, Kurt, Nov. 1991.

Primary Examiner—Patrick F. Brinson
Attorney, Agent, or Firm—John Lezdey

[57] ABSTRACT

The present invention relates to a method for joining and repairing pipes. More particularly, the invention provides a means for quickly repairing or sealing pipes utilizing photocurable resins in the form of a fabric patch. A photocurable flexible prepreg fabric is wrapped over the entire area of the pipe to be joined or repaired. Preferably, the prepreg fabric contains multiple layers of varying widths and lengths. The prepreg fabric is then exposed to UV radiation which cures and seals the pipe.

13 Claims, 2 Drawing Sheets

METHOD OF SEALING PIPES

BACKGROUND OF THE INVENTION

1. Field of the Invention

The present invention relates to a method for joining and repairing pipes. More particularly, the invention provides a means for quickly repairing or sealing pipes utilizing a photocurable prepreg fabric which is wrapped around the area to be joined or repaired.

2. Description of the Prior Art

A number of devices are known to plug apertures in pipes, tanks, automobiles, water-going vessels and the like. However, the prior art devices in many cases cannot be used in connection with hard to bond and complex surfaces. Pipes often fall in this class of surfaces.

A common practice of repairing holes in panels is to form a tapered recess in the composite material around the hole. Disk-shaped layers of structural fiber cloth of each layer are oriented at a different angle to the fibers of the adjoining layer. The layers are then secured in place by the use of high strength adhesive. A problem with these adhesives is that they require a long cure time. Also, this method of repair requires a highly trained technician and the repaired area relies totally on the adhesives to transfer the design load across the repair. A similar technique is disclosed by U.S. Pat. No. 4,544,036, granted Nov. 19, 1985, to Cosby M. Newsom. Other repair techniques, known in the patent literature are disclosed by U.S. Pat. No. 4,517,038, granted May 14, 1985 to Robert W. Miller, and U.S. Pat. No. 4,560,428 granted Dec. 24, 1985 to George O. Sherrick and Joseph R. Rosenthal.

U.S. Pat. No. 3,470,048 to Jones discloses a method of patching car bodies with an adhesive repair patch in combination with a plastic filler material containing a catalyst.

U.S. Pat. No. 4,486,254 to Zinimon discloses a heat activated patch or repair composition for metal objects. The patch or repair composition is heat activated by heating from the opposite surface to a temperature of from about 250° to 500° F.

U.S. Pat. No. 4,916,880 to Westerman discloses the combination of shaped inserts and adhesives for repairing a hole in a panel of composite materials.

European Patent Application No. 0,016,248 to Dainippon Ink & Chemical discloses a process for producing prepregs which can be used in the present invention.

U.S. Pat. No. 5,166,007 to Smith et al discloses a patch or repair assembly and method for repairing pipes. The patch or repair assembly comprises a photocurable prepreg fabric, a UV treatment release film on top of the prepreg fabric, and a UV blocking film at least covering the UV transparent release film. The method comprises applying the patch or repair assembly to the damaged area, removing the UV blocking film and subjecting the patch or repair assembly to UV light or sunlight. The disadvantages of the method taught by Smith et al are that the patches are intended for use on flat surfaces and all openings are closed by fillings. Furthermore, the parts are not joined but covered.

The present invention solves the problem of joining pipes by providing repair kits for irregular complex surfaces that are hard to bond.

The current way of joining fiberglass and/or plastic pipes involves many different methods. For example, there are many known methods for connecting fiberglass-reinforced plastic (hereinafter "FRP") pipes, and more particularly, to methods of connecting such pipes end-to-end. One common method is to thread the end of one pipe into the end of the other. It is common to use an adhesive or sealant between the threads. Another method employs a socket joint which is formed by inserting the unthreaded end of one pipe into an unthreaded socket in the end of the other pipe, usually with an adhesive between the pipe ends. Another method utilizes a butt joint in which the ends of two pipes butt up against each other. In one variation of a butt joint, the outer surfaces of the pipes are ground down to form a groove around the joint, thereby exposing the fibers of the pipes. The groove is filled with a heat-curable, resin-impregnated fiber wrap. In another variation of the butt joint, an irradiated polyethylene tape is wrapped around the joint, and a glass cloth sheet impregnated with thermosetting resin is wrapped around the polyethylene tape and then exposed to heat to cure the resin.

Some pipe manufacturers, especially those of plastic pipes, use a bell and spigot method of joining the pipes. These joints are usually glued with a cement or epoxy. In some instances, the user requires that the spigot type joint be covered and sealed with an overwrap. This overwrap is usually a fiberglass tape secondarily saturated with a polyester or epoxy type that is allowed to cure under ambient conditions. Major problems with conventional overwraps include the long time it takes to cure the resin and the difficulty in applying the resin. For instance, if conditions are too cold the worker is forced to apply heat from an external source.

Another common problem in the industry is that socket joints do not effectively connect FRP pipes because of their weak mechanical strength and poor joint sealing characteristics. The present invention solves these and other problems intrinsic to the industry.

It is to be understood that the term "fabric" as used herein is intended to include woven, non-woven and knitted materials. The term "fittings" as used herein, include couplings, elbows, tees, valves, etc. The term "pipes" as used herein include pipes and fittings. The term "photocurable" as used herein means curable upon exposure to UV and electron beam radiation. The term "photocurable resin impregnated fabric" as used herein is interchangeable with the terms "prepreg" or "prepreg fabric". The term "UV radiation" as used herein means any source of UV radiation, for example, sunlight, UV lamp and the like.

SUMMARY OF THE INVENTION

In accordance with the invention there is provided a method of forming an overwrap joint seal or patch for joining and repairing pipes. In its broadest sense, the method includes applying at least one photocurable flexible prepreg fabric layer such that it covers the area to be joined or repaired, and thereafter, exposing the prepreg fabric to UV radiation so that it cures under ambient conditions for an effective amount of time until the area to be joined or repaired is sealed.

Advantageously, a UV blocking release film is attached to the top of the prepreg fabric to prevent premature curing of the photocurable resin. Accordingly, after the prepreg fabric is applied, the step of removing the release film is required to commence the curing process of exposure to UV radiation.

The prepreg fabric of the invention may include a plurality of different layers. Each layer has a different width and length such that the first or bottom layer is shorter and narrower than the second layer. For embodiments of the invention having more than two layers, each succeeding layer is longer and wider than the layers underneath it.

Advantageously, the multiple layers are fully or partially stitched to each other to increase strength of the prepreg fabric and reduce the chances of any peeling or slipping. Furthermore, the bottom layer includes a first photocurable resin while the rest of the layers include a second photocurable resin or an adhesive.

Another embodiment of the invention uses a first water curable urethane in place of or in cooperation with the photocurable resin in the bottom layer of the prepreg fabric. The rest of the layers may include a second water curable urethane, a photocurable resin or an adhesive.

Yet another embodiment of the invention teaches a method of joining and sealing a male pipe with a female pipe such as a bell and spigot arrangement. Advantageously, this method includes the step of placing a fillet compound between the two pipes which provides a smooth transition between the surfaces of the two pipes. The prepreg fabric is then wrapped over the fillet compound.

Advantageously, the method may include the step of covering a hole in a damaged surface with a photocurable molding prior to application of the assembly.

It is an object of the invention to provide a method of applying a photocurable patch or repair assembly which can repair damaged pipes.

It is a further object of the invention to provide a method of applying a patch for joining and sealing together two pipes quickly and economically.

Other objects and aspects of the invention will be more quickly understood and better described in view of the following specification taken in conjunction with the appended drawings.

DETAIL DESCRIPTION OF THE PREFERRED EMBODIMENTS

Figure 1:
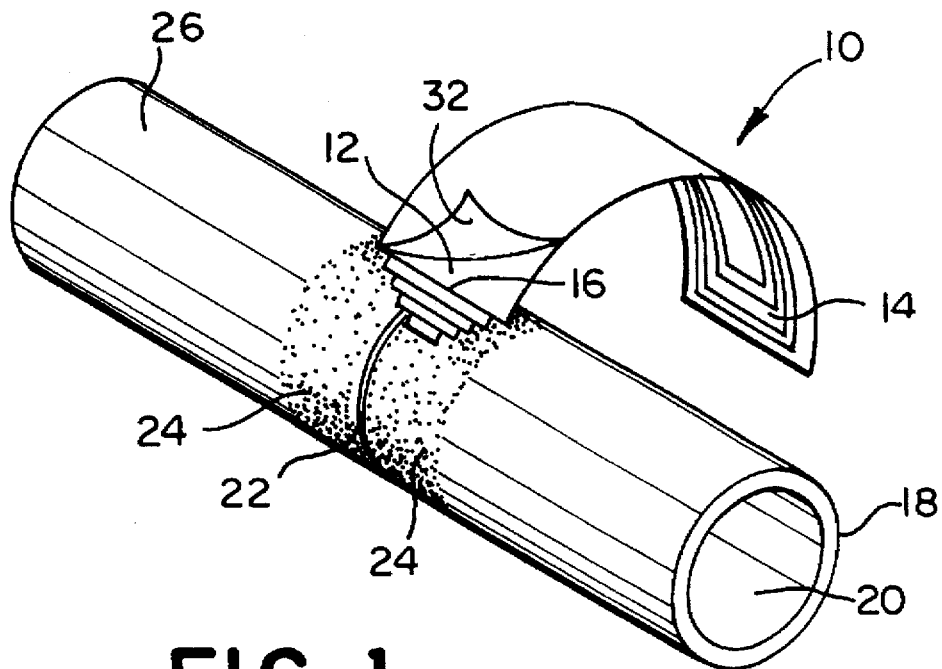
FIG. 1 shows a cross-sectional view of the patch of the invention as it is wrapped around a pipe.

Although specific terms are used in the following description for the sake of clarity, these terms are intended to refer only to the particular structure of the invention selected for illustration in the drawings and are not intended to define or limit the scope of the invention.

FIG. 1 shows a patch 10 as it is wrapped around a pipe 26 to seal a crack 22 in the pipe 26. The pipe 26 is hollow 20 and may be of any thickness. Preferably, the pipe 26 comprises plastic or steel 18. The crack 22 may go partially or wholly through the pipe 26. Advantageously, the area 24 surrounding the crack 22 is roughened up with an abrasive material such as sand paper to form a groove around the crack 22. The joining and sealing of the crack 22 employs the same principle as the joining and sealing of two pipes together to make a butt and strap joint. FIG. 1 can also represent the sealing of two pipes 26 together where reference numeral 22 represents the butted joint between the two pipes 26. As seen in FIG. 1, the patch 10 comprises a UV blocking release layer 32 and a plurality of resin impregnated fabric layers 12,14,16. Advantageously, the fabric layers are of differing widths and lengths. Preferably, the layer directly under the release layer may include an adhesive for holding the wrap in place.

It is understood and contemplated by the invention that a combination of fabric layers may be first put together in a single patch before application to the pipe to be sealed or, in the alternative, that each fabric layer be separately applied to the pipe to be sealed one after another to form the patch on the pipe.

The varying widths and lengths are arranged such that the shortest and narrowest layer is the first or bottom layer which comes in complete contact with the pipe 26. Thereafter, each succeeding layer is longer and wider than the layers beneath it. While a single layered patch can be formed with the present invention and work well on simple applications, the principal of overlapping layers added with the use of an adhesive layer makes for superior bonding characteristics both to the pipe 26 and to patch 10 itself. Therefore, complex or critical repairs should use the multi-layered embodiment of the invention. The invention preferably utilizes a first photocurable resin in the first layer and a second photocurable resin or an adhesive in each succeeding layer.

Figure 2:
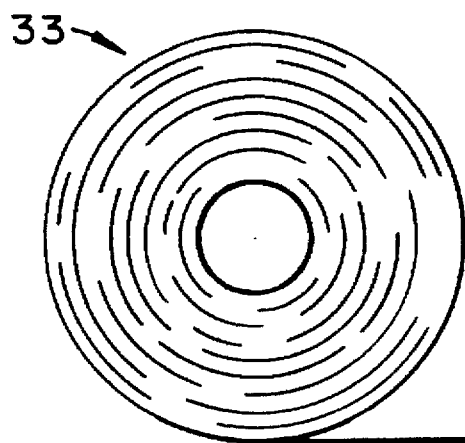
FIG. 2 is a cross-sectional side view of the patch as it peels off a roll.

FIG. 2 shows the prepreg fabric 12 being covered by an UV blocking release film 32 that peels off of a roll 33. The UV blocking release film 32 is placed on top of the prepreg fabric 12 and protects the prepreg fabric 12 from premature curing prior to application. Optionally, another UV blocking release film or an UV transparent release film may be put on the bottom of the prepreg fabric.

The basic method of the invention includes the steps of applying at least one photocurable flexible prepreg such that it covers the area of the pipe to be joined or repaired. The release film is then removed. Last, the prepreg fabric is exposed to UV radiation and allowed to cure under ambient conditions for an effective amount of time such that the area to be joined or repaired is sealed. Advantageously, the prepreg fabric includes a light transmitting fabric such as a laminated non-woven or woven fiberglass. A typical formulation includes the resin in a weight percent ratio of 30-75% and the glass in a weight percent ratio of 70-25%, depending on the type of layer and use. Preferably, the fiberglass and the photocurable resin are substantially in about a 1:1 ratio by weight.

Another embodiment of the invention provides a method of joining two FRP pipes, one male pipe and one female pipe, and fittings utilizing a socket joint and at least one photocurable flexible prepreg fabric as described above. The female pipe has an end portion with an inner surface defining a non-threaded socket. Preferably, the socket is also tapered. The male pipe has an end portion with a generally cylindrical, untapered, non-threaded outer surface. The end portion of the male pipe is inserted into the socket of the female pipe. An adhesive is preferably applied to either or both of the outer surfaces of the male pipe and the inner surface of the female pipe prior to insertion of the male pipe into the female pipe. Then, the prepreg fabric is wrapped around both pipes adjacent to the joint. Prior to wrapping the prepreg fabric around the pipes it is advantageous to apply a fillet compound between the end of the female pipe and the outer surface of the male pipe to provide a smooth transition between the outer surfaces of the pipes. The prepreg fabric is then exposed to UV radiation to cure the photocurable resin and provide a strong sealed joint between the pipes.

Figure 3:
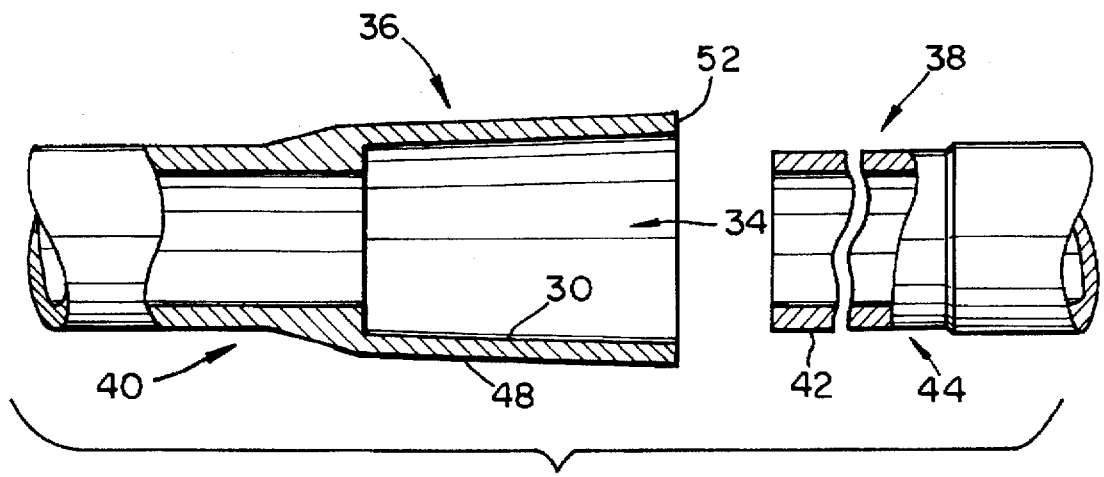
FIG. 3 is a cross-sectional side view of a male pipe and a female pipe.

FIG. 3 illustrates female and male FRP pipes, 40 and 44, respectively. The female pipe 40 has an outer surface 48, a generally planar end 52, and an end portion 36 with an inner surface 30 defining a non-threaded, tapered socket 34. Optionally, the socket 34 may be straight. The male pipe 44 has an end portion 38 with a generally cylindrical, untapered, non-threaded outer surface 42. Optionally, the outer surface 42 may be tapered.

Figure 4:
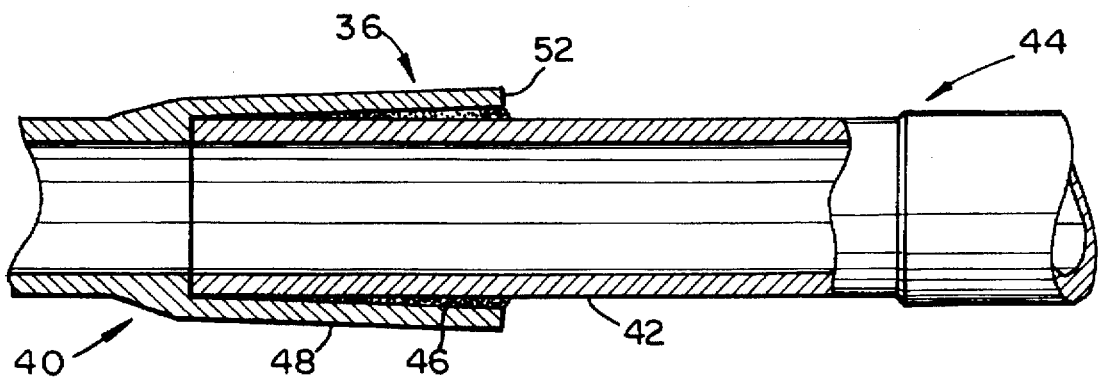
FIG. 4 is a cross-sectional side view of the pipes shown in FIG. 3 as they are connected to one another.

FIG. 4 illustrates the initial steps in connecting the pipes according to the invention. Preferably, the outer surfaces 48 and 42 of the female and male pipes 40 and 44 are first prepared by sanding or other suitable means. An adhesive 46 is then applied to at least one of the pipe surfaces, the outer surface 42 of the male pipe 44 and/or the inner surface 30 of the female pipe 40. Any suitable adhesive can be employed. Next, the end portion 38 of the male pipe 44 is inserted into the socket 34 of the female pipe 40, as shown in FIG. 2, so that the adhesive 46 substantially fills the space between the inner surface 30 of the female pipe 40 and the outer surface 42 of the male pipe 44.

Figure 5:
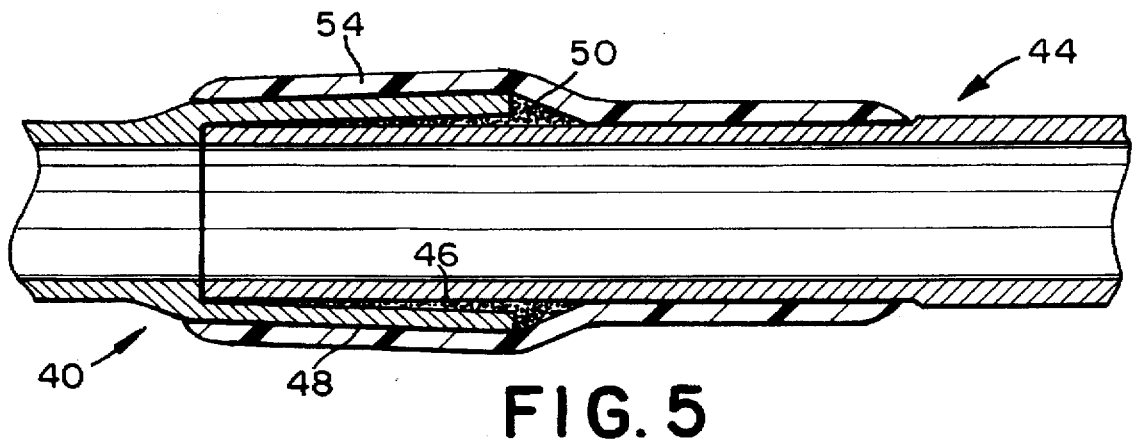
FIG. 5 is a cross-sectional side view of the pipes shown in FIG. 4 including the overwrap joint seal or patch.

FIG. 5 shows the result of applying the overwrap joint seal or patch of the invention over the two pipes. After the male pipe 44 is inserted into the socket 34 of the female pipe 40, a fillet compound 50 is placed between the end 52 of the female pipe 40 and the outer surface 42 of the male pipe 44 to provide a smooth transition between the outer surface 48 of the female pipe 40 and the outer surface 42 of the male pipe 44. Any suitable fillet compound can be employed. Next, the prepreg fabric 54 is wrapped around the end portion 36 of the female pipe 40, around the fillet compound 50, and around a portion of the male pipe 44 adjacent to the fillet compound 50. Last, the prepreg fabric 54 is exposed to UV radiation to cure the resin and provide a sealed joint between the pipes.

This method of joining FRP pipes allows the use of a simple socket joint which provides a good seal and a strong joint between the pipes. Because the UV-cured overwrap 54 provides increased joint strength, the adhesive 46 can be formulated for maximum chemical resistance and/or maximum thermal ability as opposed to strength.

For situations where pipe corrosion can occur, it is advantageous to add a corrosion resistant agent to the prepreg fabric. For ease of handling and application, the prepreg fabric is rolled up onto a hollow or solid core. When the method of the invention is practiced, one simply unrolls the prepreg fabric off of the core and onto the pipe. Preferably, the core is made out of plastic or steel. Furthermore, it is preferable to fully or partially stitch together the layers of the prepreg fabric to increase strength and reduce the risks of peeling or slipping.

The method taught by the invention offers several improvements over conventional pipe joining methods. The prepreg materials for 1 or 2 step applications of the pipe joint can be prepackaged with a long shelf life. The materials are laid out within the package to allow for a single application step of the pipe joint. Advantageously, thixotropic agents keep the resin in place in the prepreg fabric until such time that they are used on the pipe. All materials necessary for the joint laminate can be contained in one package.

The joint overwrap is preferably a flat patch approximately 6"×32 inches packaged as a one layer patch in a light proof pouch 8"×36. Preferably, the patch uses a very drapable woven fiberglass which conforms to the pipe to be joined. Further development produced an overwrap joint seal or patch which is 4"×12' and is wrapped on a plastic pipe. This is a preimpregnated fiberglass tape of 8–10 oz. with an additional 8–10 oz. per sq. yd. of resin. A black plastic layer 4.5"×12.5' is placed on top of the prepreg to protect the laminate from sunshine during installation.

A particularly advantageous patch or repair assembly comprises at least one photocurable flexible prepreg fabric, UV transparent release films on both sides of the fabric and at one least UV blocking release film over at least one of the UV transparent release films. The UV blocking release film can form part of a pouch or a container for protecting the prepreg fabric prior to use or can be in the form of a film and a separate protective pouch or container. The pouch of the invention can comprise any flexible opaque container. Preferably, a flexible metal, such as, an aluminum pouch or an opaque plastic pouch is utilized. When the pouch is evacuated prior to sealing, the prepreg fabrics of the assembly have a longer shelf life.

Preferably, the prepreg fabric is formed with a photocurable resin containing about 5 to 35% of a monomer for reducing the amount of volatiles emitted during curing. The monomers utilized are preferably selected from the group consisting of vinyl toluene, divinyl toluene, tert-butyl styrene, styrene derivatives, hydroxyalkyl acrylates, hydroxyalkyl methacrylate, 1,4-butanediol diacrylate, styrene, 1,4-butanediol dimethacrylate, polyacrylate and polymethacrylate esters.

The fabrics of the invention are comprised of fibers which can at least partially transmit UV radiation so as to initiate curing of the resin. The fabrics can in whole or in part comprise high modulus fibers and/or glass fibers. In some cases where this is utilized an adhering fabric layer adjacent to a damaged surface is composed of a high modulus fiber such as aromatic polytetrafluoethylene, polyethylene, MYLAR, and the like. S- or E-type glass fabrics have been found to be particularly advantageous because of their transparency to UV radiation and their strength.

In the production of the prepreg fabric, the amount of the composition composed of the unsaturated polyester, the unsaturated monomer and the polyisocyanate compound to be impregnated in the fabric is 35 to 85% of the volume of the resulting prepreg fabric. The amount of the composition impregnated, however, cannot be straight forwardly determined because the density of the fabric differs with its type. For example, when the fabric is made of glass fibers, the amount of the composition impregnated is generally 25 to 70% by composition. In the case of a reinforcing material composed of fabric, the amount of the resin composition impregnated is generally 40 to 80% by weight based on the total amount of the fabric and the composition. In the case of a fabric composed of metallic and glass fibers, the amount of the resin composition impregnated is generally 30 to 60% by weight based on the total amount of polyamide fibers or 45 to 80% by weight based on the total amount of the composition.

It has also been found that acrylic and methacrylic monomers when added to a commercial resin in 5 to 25% weight amounts increase the cure rate significantly. The cure time can be cut by a third to a half with the addition of these selected acrylic monomers. The acrylic monomers must either have a hydroxyl group or have a functionality of two or more, preferably, three or more. These new resins cure rapidly, retain the physical properties of the original resin, and are a lower cost system than a 100% acrylic system.

The preferred configuration of the overwrap seal or patch consists of a resin impregnated stack of fiberglass fabrics consisting of a bottom layer of mat followed by woven roving (24 oz) layer, then another layer of mat and finally a top layer of woven roving. Advantageously, the fiberglass stack is partially or totally stitched together to hold together during impregnation so that the layers do not slide around during impregnation. The total impregnated patch has a styrene, vinyl toluene (solvent) or acrylate ester resistant release film on the top and bottom. Covering the patch is a final layer of transparent UV blocking film (preferably amber or red) which permits working the patch without curing. This patch can be sealed in an aluminized or opaque plastic bag or pouch.

The invention is not limited to any particular type of resin. Rather, a wide variety of thermoset resins are available that can be gelled advantageously with a thixotropic gelling agent. Resins include epoxy, urethane, olefinically unsaturated polyester, vinyl ester, acrylic monomer, reactive olefinically unsaturated monomer and copolymers thereof. The polyester resins used in the invention can be prepared in any convenient manner and are generally composed of one or more aliphatic and/or cycloaliphatic, mono-, di and/or esters thereof. Examples of polyester resins are alcohols and one or more monovalent carboxylic acids and/or esters thereof. Examples of suitable alcohols are benzyl alcohol, ethylene glycol, propylene glycol, neopentyl glycol, hexanediol, dimethylol cyclohexane 2,2-bis-(4-hydroxycyclohexylol) propane, 2,2-bis-(p-phenyleneoxyethanol)-propane, 2,2-bis-(p-phenyleneoxypropanol-2)-propane, diethylene glycol, glycerol, trimethylol ethane, trimethylol ethane, trimethylol propane, pentaerythritol and/or dipentaerythritol.

Instead of or besides the alcohol compound(s), one or more epoxy compounds may be used, for instance, ethylene oxide, propylene oxide, epoxy propanol and isodecanoic glycidyl ester. Examples of suitable di- or polyvalent carboxylic acids are maleic acid, fumaric acid, itaconic acid, citraconic acid, malonic acid, succinic acid, glutaric acid, adipic acid, azelaic acid, sebacic acid, tetrahydrophthalic acid, hexahydrophthalic acid, dichlorophthalic acid, isophthalic acid, terephthalic acid and/or trimellitic acid. The carboxylic acid, except for, isophthalic acid and/or orthophthalic acid, may be used in the form of an anhydride. Optionally, the polyester resin may contain saturated or unsaturated monocarboxylic acids such as synthetic and/or natural fatty acids having 2 to 36 carbon atoms or esters prepared from these carboxylic acids an polyvalent alcohols such as glycerol. Examples of suitable monocarboxylic acids are fatty acid precondensates having 5 to 10 carbon atoms, heptanoic acid, pelargonic acid, isononanoic acid, lauric acid, stearic acid, oleic acid, linoleic acid, cerotic acid, benzoic acid, tert-butylbenzoic acid, acrylic acid and/or methacrylic acid.

The polyester resin may be prepared in any convenient manner, for instance, by a melting process in which reaction of the components takes place with evaporation of the water evolved in the reaction. Alternatively, use may be made of the solvent process in which the water is removed azeotropically with, for instance, an organic solvent such as toluene or xylene, after which generally the volatile constituents are to the desired extent removed in vacuum.

For ethylenically unsaturated monomers, any usual monomer may be employed. Examples of suitable monomers are styrene, α-methyl styrene, vinyl toluene, divinyl benzene, diallyl phthalate and acrylic or methacrylic (hydroxy) esters of alcohols having 1 to 12 carbon atoms such as methanol, ethanol, propanol, butanol, ethylene glycol, propylene glycol, neopentyl glycol, butanediol, hexanediol, polyethylene glycol, glycerol, trimethylol ethane, trimethylol propane and pentaerythritol. It is preferred that styrene should be used. Also suitable are mixtures of monomeric compounds, more particularly mixtures of styrene and other monomers. The monomeric compound is usually present in the composition in an amount of 2 to 55% by weight, based on the polyester composition.

Advantageously, the resin consists of an unsaturated polyester or vinyl ester resin with a styrene, acrylate or vinyl toluene monomer. In one preferred embodiment, the monomer content is held between 10% and 15% to minimize the amount of volatiles given off during curing. This is important if the overwrap method is a patch or seal performed inside of a closed area where ventilation may be poor. In addition, the use of vinyl toluene or other higher boiling monomers (less volatile) in place of styrene further reduces the volatile emissions from the patch. We have found a particularly attractive combination of vinyl toluene and hydroxyalkyl acrylates and methacrylates which promotes rapid curing and enhanced bonding. The use of the monomers is necessary in this system because the polymerization or cure rate decreases below 10% of total monomers. The preferred resin is an acrylated bisphenol A diepoxide or an acrylated novolac triepoxide with 10% of vinyl toluene and 10% hydroxypropyl acrylate. The glass fabric stack is impregnated with 30%–75% of resin depending on the specific application. The preferred amount for the repair of FRP pipes is 50%.

Prepreg fabrics which are formed with other than photocurable resins can be made with polyurethanes, epoxies, thermoplastics or phenolics which are known in the art. The same resin composition utilized in forming the prepreg fabrics can be used to form a photocurable molding composition which is utilized as a plug for holes, cracks, or the like in a damaged pipe surface being repaired. The molding composition can be made with suitable reinforcing materials, thixotropic agents and/or thickeners. The reinforcing materials can be, for instance, glass fibers, carbon fibers, high modulus fibers, metals and the like. The amount of thickeners in the polyester and vinyl ester molding compositions according to the invention is in general from 0.5 to 5%, preferably, from 1 to 3% by weight, based on the mixture.

In accordance with the invention there is provided a method of joining and/or repairing pipes having a damaged area comprising the steps of applying the patch or repair assembly of the invention to the damaged area, removing the UV blocking film, and subjecting the patch or repair assembly to UV radiation. In the event that the damaged area contains a hole, it is advantageous to first treat the damaged area with a photocurable resin composition or putty, preferably, one which is reinforced with particles of fibers. The composition or putty is used to smooth out the surface and improve adhesion. The putty can also be used as the fillet.

The method of the invention can also be performed by applying to the damaged area a first fabric comprising fibers selected from the group consisting of glass, a thermoplastic ionomer, polyethylene and polyamide. This first fabric can have an adhesive layer which is applied to the damaged area. Then, one applies over the first fabric at least one photocurable prepreg fabric. Finally, the prepreg fabric is cured by exposing it to UV radiation. In this case a multiplicity of prepreg fabrics can be applied over the first fabric and each prepreg fabric is cured prior to applying additional prepreg fabric layers. Alternatively, a fiber reinforced photocurable resin having a thickening agent can be applied to the damaged area and cured prior to applying the first fabric.

The dry preform is formed of one or more layers or plies of reinforced fiber or fabric. Each ply can be formed of a plurality of reinforcing and/or supporting fibers. The fibers can be in any conventional form such as unidirectional, woven fabric, knitted fabric, swirl mat, felt mat, wound, braided, etc. The orientation of the fibers is based on the desired directional strength of the resultant fiber reinforced resin composite. Some plies lie parallel to a predetermined direction which is usually the direction of the major force likely to be applied to the resulting monolithic structure. Such fibers may be glass, resin impregnated glass, acrylic and polyester fibers. These fibers can also contain some carbon, aramid and boron fibers.

The time of exposure to ultraviolet radiation and the intensity of the ultraviolet radiation to which the resin composition is exposed may vary greatly. Generally, exposure should continue until the polymerization is complete. The order of curing is not critical when different curing catalysts are utilized. The different resins or resin layers may be cured simultaneously or sequentially and/or post cured by autoclaving or heating.

Advantageously, the photocurable resin contains thixotropic agents and/or thickening agents to enhance bonding and curing properties and to control the flow of the resin. Thixotropic agents gel the resin so that it will easily cover the entire area to be joined or repaired and form a tight seal with the patch or repair assembly. Most preferably, the bottom layer of the prepreg fabric contains these thixotropic agents.

The thixotropic gelling agents which are preferably used in the present invention are those which cause a viscosity change that permits working with the resin and which restrains its flow from the premetered resin film or resin impregnated fabric and does not interfere with the physical characteristics of the final product. Preferred gelling agents are those which can be used at less than 5% by weight of the composition. Examples include organic sugar esters and related polyhydroxy compounds which have at least partial solubility in the resin or are totally dissolved on heating and which form a hydrogen bonded network or gel with the photocurable resin which thereby thickens it. Since the network is hydrogen bonded, any agitation or working of the resin causes the viscosity to drop and the resin to flow. For the photocurable resins these compounds should be transparent to less than 380 microns in UVA so as not to interfere with photocuring. Loadings from about 1 to 5% by weight have been found to be effective for use in prepreg fabrics. A preferred thixotropic agent is dibenzylidene sorbitol which is sold under the trademark MILLITHIX 925 by Milliken Chemical, Spartanburg, S.C. Other preferred thixotropic agents include fused silica, aluminum trihydrate, nylon, polyamides and copolymers of combinations of the above mentioned polymers.

The thickening agents which are preferably used in the present invention are thickeners based on alkaline earth metal oxides and hydroxides. Suitable thickeners include magnesium oxide, magnesium hydroxide, calcium oxide, calcium hydroxide, aluminum oxide trihydrate and liquid crystal compounds. Other suitable thickeners include soluble polymers such as di- or polyisocyanate, polyvinyl acetate, polymethylmethacrylate, polyvinyl chloride and the like and copolymers of combinations of these agents. Mixtures of the oxides and hydroxides may also be used. Furthermore, zinc oxide may be used to partly replace some of these compounds. The thickening agents may amount up to about 50% by weight of the photocurable resins provided they do not interfere with the curing. After gelling with the thickening agent, the photocurable resin can be stored in layers about ⅛ to ½ inch in thickness in opaque envelopes for long periods of time.

Advantageously, about 1 to 2% of 1,6 hexane diisocyanate is added as a thickening agent to the photocurable resin just prior to impregnation into the glass. After impregnation the resin thickens enough to run out of the glass fabric due to the small amount of cross linking caused by the diisocyanate. This thickening will occur over a period of twenty-four (24) hours at room temperature. It can be accelerated to 15–30 minutes by heating in an oven.

EXAMPLE 1

Preparation of a thixotropic resin gel.

A vinyl ester resin containing a photoinitiator was mixed with 5% by weight of sorbitol ester (MILLITHIX 925) and poured into a mold containing a plastic film. After 2 hours the resin thickened and could be rolled or stored flat in an opaque container.

EXAMPLE 2

Preparation of a thixotropic resin gel with a thickener.

A vinyl ester resin containing a photoinitiator was mixed with 5% by weight of MILLITHIX 925. The mixture was heated to 120° F. and 5% by weight of magnesium oxide was added with stirring. The mixture was poured onto a plastic film in a flat mold so as to have a thickness of about ¼ inch. The resin gel could be stored in an opaque container. In lieu of a photoinitiator there may be used a peroxide catalyst.

EXAMPLE 3

Preparation of a two layered prepreg fabric on a type.

A photocurable resin such as is made in Examples 1 or 2 was mixed with a fiberglass at a 1:1 ratio by weight. The mixture was heated and poured onto a plastic film where it hardened to form a single layered tape having a thickness of about ¼ inch, a width of about 3½ inches and a length of about 11½ inches. Thereafter, the same procedure was repeated except that a width of about 4 inches and a length of about 12 inches is formed and poured onto the single layered tape to form a two layered tape, each layer having a different width and length. The multi-layered tape is now applied to the pipe to be sealed.

The following Examples will help further illustrate preferred embodiments of the present invention. The techniques described herein are capable of variations without departing from the spirit and scope of this invention as will be apparent to those of skill in this art.

EXAMPLE 4

Preparation of a two layered prepreg fabric on the pipe.

The method of Example 3 was followed up to the formation of a first single layered tape having the following dimensions: ¼ inch thick, 3½ inches wide and 11½ inches long. A separate second single layered tape is formed having the following dimensions: ¼ inch thick, 4 inches wide and 12 inches long. The shorter and narrower second tape is then applied to the pipe to be sealed. Thereafter, the longer and wider second tape is applied over the first tape.

What is claimed is:

1. A method of forming an overwrap joint seal for joining pipes and repairing a pipe, said method comprising the steps of:

a) applying a photocurable flexible prepreg fabric over said pipe or pipes such that it covers the area to be joined or repaired, said prepreg fabric being covered by an UV blocking release film;

b) removing said release film; and c) exposing said prepreg fabric to UV radiation such as to allow said prepreg fabric to cure under ambient conditions for an effective amount of time until said area to be joined or repaired is sealed;

wherein said prepreg comprises at least two different layers of varying widths and lengths such that each layer is shorter and narrower than the layer immediately above it; wherein said bottom layer includes a first water curable urethane; and wherein each succeeding layer includes a second water curable urethane and bond selected from the group consisting of a photocurable resin and an adhesive.

2. The method of claim 1 wherein said prepreg fabric is selected from the group consisting of a laminated non-woven fiberglass and a laminated woven fiberglass.

3. The method of claim 2 wherein said fiberglass and said photocurable resin are substantially in about a 1:1 ratio by weight.

4. The method of claim 1 wherein said prepreg fabric further comprises a corrosion resistant agent.

5. The method of claim 1 further comprising a UV blocking release film on the bottom of said prepreg fabric.

6. The method of claim 1 wherein said prepreg fabric layers are stitched to each other.

7. The method of claim 1 wherein said photocurable resin further comprises a thixotropic agent.

8. The method of claim 7 wherein said thixotropic agent comprises a polymer selected from the group consisting of fused silica, aluminum trihydrate, nylon, polyamides, dibenzylidene sorbitol, organic sugar ester, and copolymers of combinations of said group.

9. The method of claim 7 wherein said thixotropic agent forms a hydrogen bonded network with said photocurable resin.

10. The method of claim 1 wherein said photocurable resin further comprises a thickening agent.

11. The method of claim 10 wherein said thickening agent comprises a material selected from the group consisting of di- or polyisocyanate, magnesium oxide, and copolymers of combinations of said group.

12. The method of claim 1 wherein said photocurable resin comprises a thermoset resin selected from the group consisting of unsaturated polyester, polyurethane, vinyl ester, epoxy, reactive olefinically unsaturated monomer and acrylic monomer.

13. A patch or repair assembly for joining or repairing pipes prepared by the method of claim 1.

* * * * *